US012569781B2

(12) United States Patent　　　(10) Patent No.:　US 12,569,781 B2
Steinke et al.　　　　　　　　　　(45) Date of Patent:　　Mar. 10, 2026

(54) FLUIDICALLY COUPLING WITH ELASTIC STRUCTURE DEFORMABLE BY SEALING ELEMENT

(71) Applicant: Agilent Technologies, Inc., Santa Clara, CA (US)

(72) Inventors: Armin Steinke, Ettlingen (DE); Christian Daniel Ruf, Karlsbad (DE)

(73) Assignee: Agilent Technologies, Inc., Santa Clara, CA (US)

( * ) Notice: Subject to any disclaimer, the term of this patent is extended or adjusted under 35 U.S.C. 154(b) by 418 days.

(21) Appl. No.: 18/021,371

(22) PCT Filed: Aug. 17, 2021

(86) PCT No.: PCT/IB2021/057537
　　§ 371 (c)(1),
　　(2) Date: Feb. 14, 2023

(87) PCT Pub. No.: WO2022/038496
　　PCT Pub. Date: Feb. 24, 2022

(65) Prior Publication Data
　　US 2024/0033656 A1　　Feb. 1, 2024

(30) Foreign Application Priority Data

Aug. 18, 2020　(GB) ..................................... 2012877

(51) Int. Cl.
　　*B01D 15/18*　　　(2006.01)
　　*B01D 15/16*　　　(2006.01)
　　*B01L 3/00*　　　(2006.01)
(52) U.S. Cl.
　　CPC ........... *B01D 15/18* (2013.01); *B01D 15/166* (2013.01); *B01L 3/502715* (2013.01);
　　　　(Continued)

(58) Field of Classification Search
　　None
　　See application file for complete search history.

(56) References Cited

U.S. PATENT DOCUMENTS 4,982,597 A　　1/1991　Berger
6,280,589 B1　　8/2001　Manz et al.
　　　　(Continued)

FOREIGN PATENT DOCUMENTS

CN　　103026221 A　　4/2013
CN　　103270411 A　　8/2013
　　　　(Continued)

OTHER PUBLICATIONS

PCT Notification of Transmittal of The International Search Report & Written Opinion mailed on Nov. 12, 2021 for Application No. PCT/IB2021/057537, 16 Pages.
　　　　(Continued)

*Primary Examiner* — Peter Keyworth

(57) ABSTRACT

A fluidic coupling is positioned between a first fluidic structure and a second fluidic structure. The first fluidic structure has a first channel configured for conducting fluid and opening at a first opening at a first surface of the first fluidic structure. The second fluidic structure has a second channel configured for conducting fluid and opening at a second opening at a second surface of the second fluidic structure. The fluidic coupling includes a sealing element and an elastic structure. The elastic structure may be elastically deformed by the sealing element, thus allowing a fluidic communication between the first channel and the second channel.

19 Claims, 4 Drawing Sheets

(52) U.S. Cl.
CPC ... *B01L 2200/025* (2013.01); *B01L 2200/027* (2013.01); *B01L 2200/0689* (2013.01); *B01L 2300/123* (2013.01)

(56) References Cited

U.S. PATENT DOCUMENTS

| | | | |
|---|---|---|---|
| 6,814,846 | B1 | 11/2004 | Berndt |
| 7,028,536 | B2 | 4/2006 | Karp et al. |
| 2005/0048669 | A1 | 3/2005 | Hobbs et al. |
| 2011/0023976 | A1* | 2/2011 | Baeuerle ............ G01N 30/6004 228/172 |
| 2011/0286885 | A1 | 11/2011 | Park et al. |
| 2014/0102568 | A1 | 4/2014 | Servin |
| 2018/0246072 | A1 | 8/2018 | Steinke |

FOREIGN PATENT DOCUMENTS

| | | |
|---|---|---|
| CN | 107850583 A | 3/2018 |
| DE | 19928412 A1 | 1/2001 |
| DE | 102016108101 A1 | 12/2016 |
| EP | 309596 A1 | 4/1989 |
| EP | 1577012 A1 | 9/2005 |
| WO | 9604547 A1 | 2/1996 |
| WO | 9849548 A1 | 11/1998 |
| WO | 0078454 A1 | 12/2000 |
| WO | 0109598 A1 | 2/2001 |
| WO | 2009121410 A1 | 10/2009 |
| WO | 2017025857 A1 | 2/2017 |
| WO | 2019126212 A1 | 6/2019 |

OTHER PUBLICATIONS

UK Intellectual Property Office Combined Search and Examination Report under Section 17 and 18 (3) dated Feb. 18, 2021 for Application No. GB2012877.3; 5 pages.

Chinese office action and search report dated Jul. 10, 2025 for application No. 202180050854.9; 10 pages.

* cited by examiner

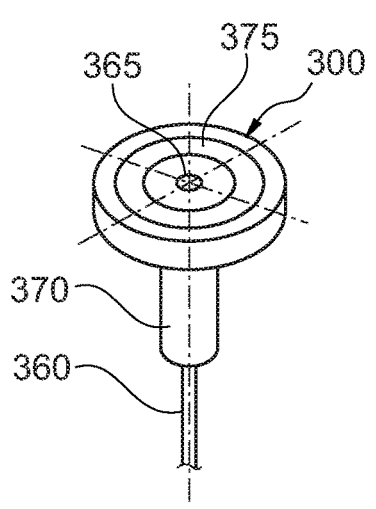
Fig. 3D
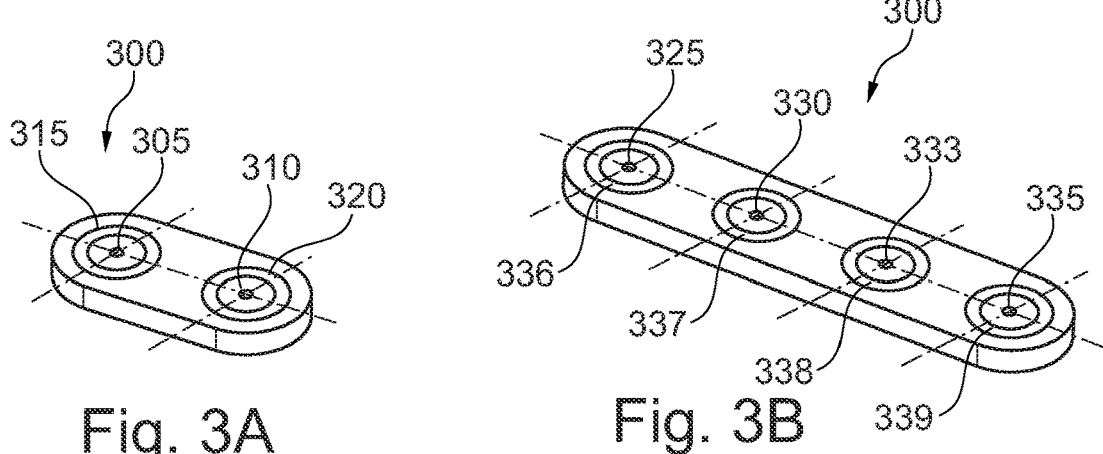
Fig. 3A
Fig. 3B
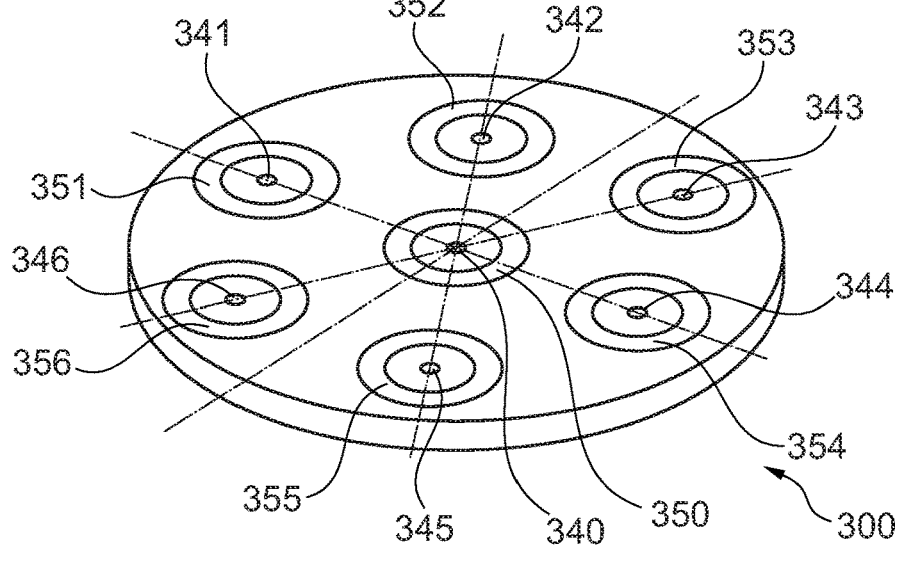
Fig. 3C

FLUIDICALLY COUPLING WITH ELASTIC STRUCTURE DEFORMABLE BY SEALING ELEMENT

RELATED APPLICATIONS

This application is the national stage under 35 U.S.C. 371 of International Application No. PCT/IB2021/057537, filed Aug. 17, 2021; which claims priority to UK Application No. GB 2012877.3, filed Aug. 18, 2020; the entire contents of each of which are incorporated by reference herein.

TECHNICAL FIELD

The present invention relates to fluidically coupling between a first fluidic structure and a second fluidic structure, in particular in a high-performance liquid chromatography application.

BACKGROUND

In high-performance liquid chromatography (HPLC), a liquid has to be provided usually at a very controlled flow rate (e.g., in the range of microliters to milliliters per minute) and at high pressure (typically 20-100 MPa, 200-1000 bar, and beyond up to currently 200 MPa, 2000 bar) at which compressibility of the liquid becomes noticeable. For liquid separation in an HPLC system, a mobile phase comprising a sample fluid (e.g. a chemical or biological mixture) with compounds to be separated is driven through a stationary phase (such as a chromatographic column packing), thus separating different compounds of the sample fluid which may then be identified. The term compound, as used herein, shall cover compounds which might comprise one or more different components.

The mobile phase, for example a solvent, is pumped under high pressure typically through a chromatographic column containing packing medium (also referred to as packing material or stationary phase). As the sample is carried through the column by the liquid flow, the different compounds, each one having a different affinity to the packing medium, move through the column at different speeds. Those compounds having greater affinity for the stationary phase move more slowly through the column than those having less affinity, and this speed differential results in the compounds being separated from one another as they pass through the column. The stationary phase is subject to a mechanical force generated in particular by a hydraulic pump that pumps the mobile phase usually from an upstream connection of the column to a downstream connection of the column. As a result of flow, depending on the physical properties of the stationary phase and the mobile phase, a relatively high pressure drop is generated across the column.

The mobile phase with the separated compounds exits the column and passes through a detector, which registers and/or identifies the molecules, for example by spectrophotometric absorbance measurements. A two-dimensional plot of the detector measurements against elution time or volume, known as a chromatogram, may be made, and from the chromatogram the compounds may be identified. For each compound, the chromatogram displays a separate curve feature also designated as a "peak". Efficient separation of the compounds by the column is advantageous because it provides for measurements yielding well defined peaks having sharp maxima inflection points and narrow base widths, allowing excellent resolution and reliable identification and quantitation of the mixture constituents. Broad peaks, caused by poor column performance, so called "Internal Band Broadening" or poor system performance, so called "External Band Broadening" are undesirable as they may allow minor components of the mixture to be masked by major components and go unidentified.

Fluidic couplers are widely used for providing a fluidic coupling between two or more fluidic components, e.g. for coupling a capillary to a device, for coupling two devices, et cetera. Such fluidic couplers may be used at various positions within the flow path e.g. within an HPLC system.

Planar microfluidic structures are described e.g. in WO0078454A1, DE19928412A1, U.S. Pat. No. 6,814,846, WO9849548, U.S. Pat. No. 6,280,589, or WO9604547. WO2009121410A1 by the same applicant discloses fluidic coupling of planar fluidic structures. the entire contents of each of which are incorporated herein.

SUMMARY

There may be a need to provide an improved fluidic coupling between fluidic structures, in particular for HPLC applications.

In an embodiment, a fluidic coupling is provided by and between a first fluidic structure and a second fluidic structure and being configured for fluidically coupling the first fluidic structure with the second fluidic structure. The first fluidic structure has a first channel configured for conducting fluid and opening at a first opening at a first surface of the first fluidic structure. The second fluidic structure has a second channel configured for conducting fluid and opening at a second opening at a second surface of the second fluidic structure. The fluidic coupling comprises a sealing element positioned between the first surface and the second surface. The first fluidic structure comprises a first elastic structure in and/or below the first surface. When the first surface and the second surface are pressed against each other, the first elastic structure is elastically deformed by the sealing element, the first opening and the second opening are in fluidic communication with each other, thus allowing a fluidic communication between the first channel and the second channel, and the sealing element is fluidically sealing the fluidic communication between the first channel and the second channel. This allows to provide a reliable fluidically sealing of the fluidic coupling, which also may be repeatable in a sense of allowing to repeatedly enable and disable the fluidic coupling e.g. by pressing together of and releasing pressure between the first fluidic structure and the second fluidic structure. Further, this may allow to avoid or at least reduce deformation of the sealing element.

In one embodiment, at least one of the first fluidic structure and the second fluidic structure is a planar structure. This allows providing a reliable and sealed coupling of planar structures, e.g. when applying microfluidic planar structures having extremely small physical dimensions, in particular of the channels for conducting fluid.

In one embodiment, the first fluidic structure is provided by a plurality of layers fixedly joined with each other, wherein the first channel is provided by a void between two of the plurality of layers. The layer structure allows providing the first elastic structure by adequately arranging, forming and structuring one or more of the plurality of layers.

In one embodiment, the second fluidic structure is provided by a plurality of layers fixedly joined with each other, wherein the second channel is provided by a void between two of the plurality of layers. The layer structure allows providing the second elastic structure by adequately arranging, forming and structuring one or more of the plurality of layers.

In one embodiment, at least one of the first fluidic structure and the second fluidic structure comprises or is comprised of one or more of the following materials: metal, in particular high-grade steel (e.g. 316L, MP35N, 304), ceramics, in particular aluminum oxide, manganese oxide, zirconium oxide, aluminum nitrate, polymer, in particular PEAK polyether ether ketone (PEEK), polyetherketoneketone (PEKK), (polyetherketone), polyetherimide (PEI) (e.g., ULTEM polymer), etc.

In one embodiment, the sealing element has a ring shape, such as a concentric ring shape. This allows increasing in simplifying the sealing properties in that the sealing element is e.g. concentrically surrounding the respective opening of the respective fluidic structure.

In one embodiment, the sealing element is projecting beyond at least one of the first surface and the second surface, at least before pressing the first surface and the second surface against each other.

In one embodiment, the sealing element is part of or attached (e.g. fixed) to one of the first surface and the second surface, such as by a pressing or dispensing procedure. Every suitable kind of attaching as known in the art can be applied, e.g. ranging from simply putting the sealing element on the respective surface, over fixing the sealing element to the respective surface e.g. by gluing, to dispensing (e.g. printing, sputtering, et cetera) the sealing element on the respective surface e.g. as part of a production process.

In one embodiment, the sealing element comprises or is comprised of one or more of the following materials: ductile and printable polymer compounds, in particular PEAK, PEEK, PEKK, PEI, etc.

In one embodiment, the first elastic structure is provided below an area of the first surface where the sealing element is abutting to the first surface when the first surface and second surface are pressed against each other.

In one embodiment, the first elastic structure is provided by a first membrane and a first void (e.g. channel, a hollow space, a cavity, a clearance or the like) below the first membrane. The first membrane is a part of the first surface, and the first membrane is elastically deformed into the first void when the first elastic structure is elastically deformed by the sealing element.

In one embodiment, the first void can be subjected to pressure, such as by providing a pressurized fluid into the first void, in order to modify an elastic property of the first elastic structure. This may allow adjusting and/or controlling the elastic properties of the elastic structure, for example dependent on a pressure in the fluidic path of the first channel and the second channel. In one embodiment, the same fluid (e.g. a mobile phase in an HPLC system) flowing in the fluidic path of the first channel and the second channel is used for pressuring the void, which may lead to an automatic adjustment of the sealing force and/or properties dependent on the actual requirement for sealing.

In one embodiment, the second fluidic structure comprises a second elastic structure. This allows distributing deformation provided by the sealing element the first fluidic structure and the second fluidic structure and/or adjusting and/or controlling such deformation. The second elastic structure may be provided fully in accordance and substantially identical to the first elastic structure, e.g. in the sense of a symmetrical configuration, e.g. with the sealing element in between the first elastic structure and a second elastic structure.

In one embodiment, the second elastic structure is provided by a second membrane and a second void (e.g. channel, a hollow space, a cavity, a clearance or the like) below the second membrane. The second membrane is a part of the second surface, and the second membrane is elastically deformed into the second void when the second elastic structure is elastically deformed by the sealing element.

In one embodiment, the second void can be subjected to pressure, such as by providing a pressurized fluid into the second void, in order to modify an elastic property of the second elastic structure. This may allow adjusting and/or controlling the elastic properties of the elastic structure, for example dependent on a pressure in the fluidic path of the first channel and the second channel.

In one embodiment, the same fluid (e.g. a mobile phase in an HPLC system) flowing in the fluidic path of the first channel and the second channel is used for pressuring the void, which may lead to an automatic adjustment of the sealing force and/or properties dependent on the actual requirement for sealing.

In one embodiment, the fluidic coupling comprises a force applicator, such as a thread, a cam or an expanding medium, configured for pressing the first surface and the second surface against each other.

In one embodiment, the first opening and the second opening are adjacent to and substantially aligned with each other when the first surface and the second surface are pressed against each other.

In one embodiment, the sealing element is fluidically sealing the fluidic communication between the first channel and the second channel in a pressure range of up to 2000 bar and beyond.

In one embodiment, at least one of the first fluidic structure and the second fluidic structure is a planar structure. The first fluidic structure is provided by a plurality of layers fixedly joined with each other, the first channel is provided by a first void between two of the plurality of layers, and the plurality of layers may be composed of a metal material. The first surface is provided by an outer layer of the plurality of layers, and the first elastic structure is provided by a portion of the outer layer and a second void below the portion of the outer layer. The portion of the outer layer above the void is configured to act as a membrane being elastically deformable into the void when the first elastic structure is elastically deformed by the sealing element. Such embodiment can be provided using a so-called metal microfluidic (MMF) structure being a multilayer structure comprising two or more metal sheets bonded together e.g. by diffusion bonding, as described e.g. in the aforementioned WO2009121410A1 or in WO2017025857A1, both by the same applicant the entire contents of each of which are incorporated herein by reference.

In one embodiment, a separation system is provided for separating compounds of a sample fluid in a mobile phase. The fluid separation system comprises a mobile phase drive, such as a pumping system, adapted to drive the mobile phase through the fluid separation system, a separation unit, such as a chromatographic column, adapted for separating compounds of the sample fluid in the mobile phase, a first fluidic structure for conducting fluid, a second fluidic structure for conducting fluid, and a fluidic coupling (according to any of the aforementioned embodiments) for fluidically coupling the first fluidic structure with the second fluidic structure.

In one embodiment, the separation system further comprises at least one of: a sample dispatcher adapted to introduce the sample fluid into the mobile phase; a detector adapted to detect separated compounds of the sample fluid; a collection unit adapted to collect separated compounds of the sample fluid; a data processing unit adapted to process data received from the fluid separation system; and a degassing apparatus for degassing the mobile phase.

In one embodiment, a method is provided for fluidically coupling a first fluidic structure with a second fluidic structure. The first fluidic structure has a first channel configured for conducting fluid and opening at a first opening at a first surface of the first fluidic structure. The second fluidic structure has a second channel configured for conducting fluid and opening at a second opening at a second surface of the second fluidic structure. The method comprises positioning a sealing element between the first surface and the second surface, and pressing the first surface and the second surface against each other, so that the sealing element will elastically deform an elastic structure in and/or below the first surface, the first opening and the second opening are in fluidic communication with each other, thus allowing a fluidic communication between the first channel and the second channel, and the sealing element is fluidically sealing the fluidic communication between the first channel and the second channel.

Embodiments of the present disclosure might be embodied based on most conventionally available HPLC systems, such as the Agilent 1220, 1260 and 1290 Infinity LC Series (provided by the applicant Agilent Technologies).

One embodiment of an HPLC system comprises a pumping apparatus having a piston for reciprocation in a pump working chamber to compress liquid in the pump working chamber to a high pressure at which compressibility of the liquid becomes noticeable.

One embodiment of an HPLC system comprises two pumping apparatuses coupled either in a serial or parallel manner. In the serial manner, as disclosed in EP 309596 A1, the entire contents of which are incorporated by reference herein, an outlet of the first pumping apparatus is coupled to an inlet of the second pumping apparatus, and an outlet of the second pumping apparatus provides an outlet of the pump. In the parallel manner, an inlet of the first pumping apparatus is coupled to an inlet of the second pumping apparatus, and an outlet of the first pumping apparatus is coupled to an outlet of the second pumping apparatus, thus providing an outlet of the pump. In either case, a liquid outlet of the first pumping apparatus is phase shifted, such as essentially by 180 degrees, with respect to a liquid outlet of the second pumping apparatus, so that only one pumping apparatus is supplying into the system while the other is intaking liquid (e.g. from the supply), thus allowing to provide a continuous flow at the output. However, it is clear that also both pumping apparatuses might be operated in parallel (i.e. concurrently), at least during certain transitional phases e.g. to provide a smooth (er) transition of the pumping cycles between the pumping apparatuses. The phase shifting might be varied in order to compensate for pulsation in the flow of liquid as resulting from the compressibility of the liquid. It is also known to use three piston pumps having about 120 degrees phase shift. Also, other types of pumps are known and operable in conjunction with the present disclosure.

The separating device may include a chromatographic column providing the stationary phase. The column might be a glass, metal, ceramic or a composite material tube (e.g. with a diameter from 50 μm to 5 mm and a length of 1 cm to 1 m) or a microfluidic column (as disclosed e.g. in EP 1577012 A1, the entire contents of which are incorporated by reference herein, or the Agilent 1200 Series HPLC-Chip/

MS System provided by the applicant Agilent Technologies. The individual components are retained by the stationary phase differently and separate from each other while they are propagating at different speeds through the column with the eluent. At the end of the column they elute at least partly separated from each other. During the entire chromatography process the eluent might be also collected in a series of fractions. The stationary phase or adsorbent in column chromatography usually is a solid material. The most common stationary phase for column chromatography is silica gel, followed by alumina. Cellulose powder has often been used in the past. Also possible are ion exchange chromatography, reversed-phase chromatography (RP), affinity chromatography or expanded bed adsorption (EBA). The stationary phases are usually finely ground powders or gels and/or are microporous for an increased surface, which can be especially chemically modified, though in EBA a fluidized bed is used.

The mobile phase (or eluent) can be either a pure solvent or a mixture of different solvents. It can also contain additives, i.e. be a solution of the said additives in a solvent or a mixture of solvents. It can be chosen e.g. to adjust the retention of the compounds of interest and/or the amount of mobile phase to run the chromatography. The mobile phase can also be chosen so that the different compounds can be separated effectively. The mobile phase might comprise an organic solvent like e.g. methanol or acetonitrile, often diluted with water. For gradient operation water and organic is delivered in separate containers, from which the gradient pump delivers a programmed blend to the system. Other commonly used solvents may be isopropanol, tetrahydrofuran (THF), hexane, ethanol and/or any combination thereof or any combination of these with aforementioned solvents.

The sample fluid might comprise any type of process liquid, natural sample like juice, body fluids like plasma or it may be the result of a reaction like from a fermentation broth.

The fluid is typically a liquid but may also be or comprise a gas and/or a supercritical fluid (as e.g. used in supercritical fluid chromatography—SFC—as disclosed e.g. in U.S. Pat. No. 4,982,597 A, the entire contents of which are incorporated herein by reference).

The pressure in the mobile phase might range from 2-200 MPa (20 to 2000 bar), in particular 10-150 MPa (100 to 1500 bar), and more particularly 50-120 MPa (500 to 1200 bar).

The HPLC system might further comprise a detector for detecting separated compounds of the sample fluid, a fractionating unit for outputting separated compounds of the sample fluid, or any combination thereof. Further details of HPLC system are disclosed with respect to the aforementioned Agilent HPLC series, provided by the applicant Agilent Technologies.

Embodiments of the disclosure can be partly or entirely embodied or supported by one or more suitable software programs, which can be stored on or otherwise provided by any kind of data carrier, and which might be executed in or by any suitable data processing unit. Software programs or routines can be applied in or by the control unit.

In the context of this application, the term "fluidic sample" may particularly denote any liquid and/or gaseous medium, optionally including also solid particles, which is to be analyzed. Such a fluidic sample may comprise a plurality of fractions of molecules or particles which shall be separated, for instance biomolecules such as proteins. Since separation of a fluidic sample into fractions involves a certain separation criterion (such as mass, volume, chemical properties, etc.) according to which a separation is carried out, each separated fraction may be further separated by another separation criterion (such as mass, volume, chemical properties, etc.), thereby splitting up or separating a separate fraction into a plurality of sub-fractions.

In the context of this application, the term "fraction" may particularly denote such a group of molecules or particles of a fluidic sample which have a certain property (such as mass, volume, chemical properties, etc.) in common according to which the separation has been carried out. However, molecules or particles relating to one fraction can still have some degree of heterogeneity, i.e. can be further separated in accordance with another separation criterion.

In the context of this application, the term "sub-fractions" may particularly denote individual groups of molecules or particles all relating to a certain fraction which still differ from one another regarding a certain property (such as mass, volume, chemical properties, etc.). Hence, applying another separation criterion for the second separation as compared to the separation criterion for the first separation allows these groups to be further separated from one another by applying the other separation criterion, thereby obtaining the further separated sub-fractions.

In the context of this application, the term "downstream" may particularly denote that a fluidic member located downstream compared to another fluidic member will only be brought in interaction with a fluidic sample or its components after interaction of those with the other fluidic member (hence being arranged upstream). Therefore, the terms "downstream" and "upstream" relate to a general flowing direction of the fluidic sample or its components, but do not necessarily imply a direct uninterrupted fluidic connection from the upstream to the downstream system parts.

In the context of this application, the term "sample separation apparatus" may particularly denote any apparatus which is capable of separating different fractions of a fluidic sample by applying a certain separation technique. Particularly, two separation units may be provided in such a sample separation apparatus when being configured for a two-dimensional separation. This means that the sample or any of its parts or subset(s) is first separated in accordance with a first separation criterion, and is subsequently separated in accordance with a second separation criterion, which may be the same or different.

The term "separation unit" may particularly denote a fluidic member through which a fluidic sample is guided and which is configured so that, upon conducting the fluidic sample through the separation unit, the fluidic sample or some of its components will be at least partially separated into different groups of molecules or particles (called fractions or sub-fractions, respectively) according to a certain selection criterion. An example for a separation unit is a liquid chromatography column which is capable of selectively retarding different fractions of the fluidic sample.

In the context of this application, the terms "fluid drive" or "mobile phase drive" may particularly denote any kind of pump or fluid flow source or supply which is configured for conducting a mobile phase and/or a fluidic sample along a fluidic path. A corresponding fluid supply system may be configured for metering two or more fluids in controlled proportions and for supplying a resultant mixture as a mobile phase. It is possible to provide a plurality of solvent supply lines, each fluidically connected with a respective reservoir containing a respective fluid, a proportioning appliance interposed between the solvent supply lines and the inlet of the fluid drive, the proportioning appliance configured for modulating solvent composition by sequentially coupling selected ones of the solvent supply lines with the inlet of the fluid drive, wherein the fluid drive is configured for taking in fluids from the selected solvent supply lines and for supplying a mixture of the fluids at its outlet. More particularly, one fluid drive can be configured to provide a mobile phase flow which drives or carries the fluidic sample through a respective separation unit, whereas another fluid drive can be configured to provide a further mobile phase flow which drives or carries the fluidic sample or its parts after treatment by respective separation unit, through a further separation unit.

BRIEF DESCRIPTION OF DRAWINGS

Other objects and many of the attendant advantages of embodiments of the present disclosure will be readily appreciated and become better understood by reference to the following more detailed description of embodiments in connection with the accompanying drawing(s). Features that are substantially or functionally equal or similar will be referred to by the same reference sign(s). The illustration in the drawing is schematically.

FIG. 3A is a perspective view of an example of a fluidic structure according to the present disclosure.

FIG. 3B is a perspective view of another example of a fluidic structure according to the present disclosure.

FIG. 3C is a perspective view of another example of a fluidic structure according to the present disclosure.

FIG. 3D is a perspective view of another example of a fluidic structure according to the present disclosure.

DETAILED DESCRIPTION

Figure 1:
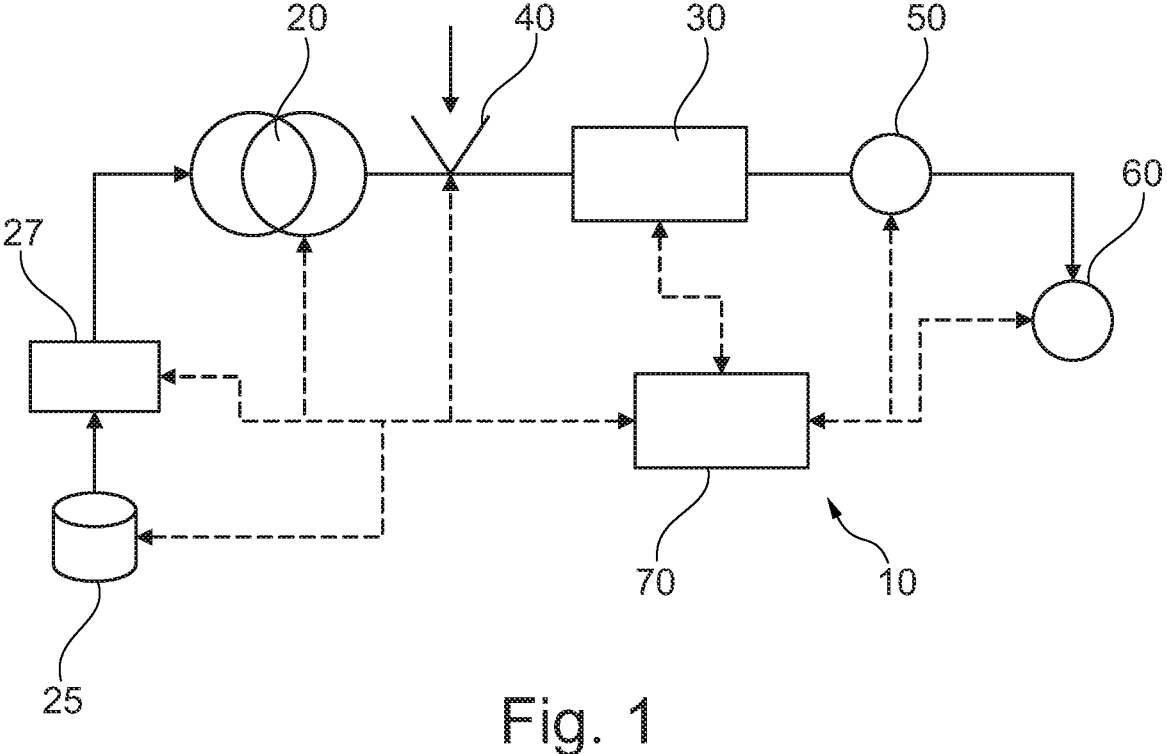
FIG. 1 shows a liquid separation system 10, in accordance with embodiments of the present disclosure, e.g. used in high-performance liquid chromatography (HPLC).

Referring now in greater detail to the drawings, FIG. 1 depicts a general schematic of a liquid separation system 10. A pump 20 receives a mobile phase from a solvent supply 25, typically via a degasser 27, which degases the mobile phase and thus reduces the amount of dissolved gases in it. The pump 20—as a mobile phase drive—drives the mobile phase through a separating device 30 (such as a chromatographic column) comprising a stationary phase. A sample dispatcher 40 (also referred to as sample introduction apparatus, sample injector, etc.) is provided between the pump 20 and the separating device 30 in order to subject or add (often referred to as sample introduction) portions of one or more sample fluids into the flow of a mobile phase (denoted by reference numeral 200, see also FIG. 2). The stationary phase of the separating device 30 is adapted for separating compounds of the sample fluid, e.g. a liquid. A detector 50 is provided for detecting separated compounds of the sample fluid. A fractionating unit 60 can be provided for outputting separated compounds of sample fluid.

While the mobile phase can be comprised of one solvent only, it may also be mixed of plurality of solvents. Such mixing might be a low pressure mixing and provided upstream of the pump 20, so that the pump 20 already receives and pumps the mixed solvents as the mobile phase.

Alternatively, the pump 20 might be comprised of plural individual pumping units, with plural of the pumping units each receiving and pumping a different solvent or mixture, so that the mixing of the mobile phase (as received by the separating device 30) occurs at high pressure and downstream of the pump 20 (or as part thereof). The composition (mixture) of the mobile phase may be kept constant over time, the so-called isocratic mode, or varied over time, the so-called gradient mode.

A data processing unit 70, which can be a conventional PC or workstation, might be coupled (as indicated by the dotted arrows) to one or more of the devices in the liquid separation system 10 in order to receive information and/or control operation. For example, the data processing unit 70 might control operation of the pump 20 (e.g. setting control parameters) and receive therefrom information regarding the actual working conditions (such as output pressure, flow rate, etc. at an outlet of the pump). The data processing unit 70 might also control operation of the solvent supply 25 (e.g. monitoring the level or amount of the solvent available) and/or the degasser 27 (e.g. setting control parameters such as vacuum level) and might receive therefrom information regarding the actual working conditions (such as solvent composition supplied over time, flow rate, vacuum level, etc.). The data processing unit 70 might further control operation of the sample dispatcher 40 (e.g. controlling sample introduction or synchronization of the sample introduction with operating conditions of the pump 20). The separating device 30 might also be controlled by the data processing unit 70 (e.g. selecting a specific flow path or column, setting operation temperature, etc.), and send—in return—information (e.g. operating conditions) to the data processing unit 70. Accordingly, the detector 50 might be controlled by the data processing unit 70 (e.g. with respect to spectral or wavelength settings, setting time constants, start/stop data acquisition), and send information (e.g. about the detected sample compounds) to the data processing unit 70. The data processing unit 70 might also control operation of the fractionating unit 60 (e.g. in conjunction with data received from the detector 50) and provides data back. Finally, the data processing unit might also process the data received from the system or its part and evaluate it in order to represent it in adequate form prepared for further interpretation.

Fluidic couplers are widely used for providing a fluidic coupling between two or more fluidic components, e.g. for coupling a capillary to a device, for coupling two devices, et cetera. Such fluidic couplers may be used at various positions within the flow path e.g. in the embodiment of FIG. 1 between the solvent supply 25 and the fractionating unit 60. As an example, a fluidic coupler may be used for coupling a capillary leading from the degasser 27 to the pump 20, a flow line (such as another capillary) from the pump 20 to the sample dispatcher 40, another flow line (such as a microfluidic structure) between the sample dispatcher 40 and the separating device 30, et cetera. It is clear and readily known in the art that such fluidic couplers may be used virtually at any position in a fluidic flow path were fluidic coupling between individual physical entities is required or useful.

Figure 2A:
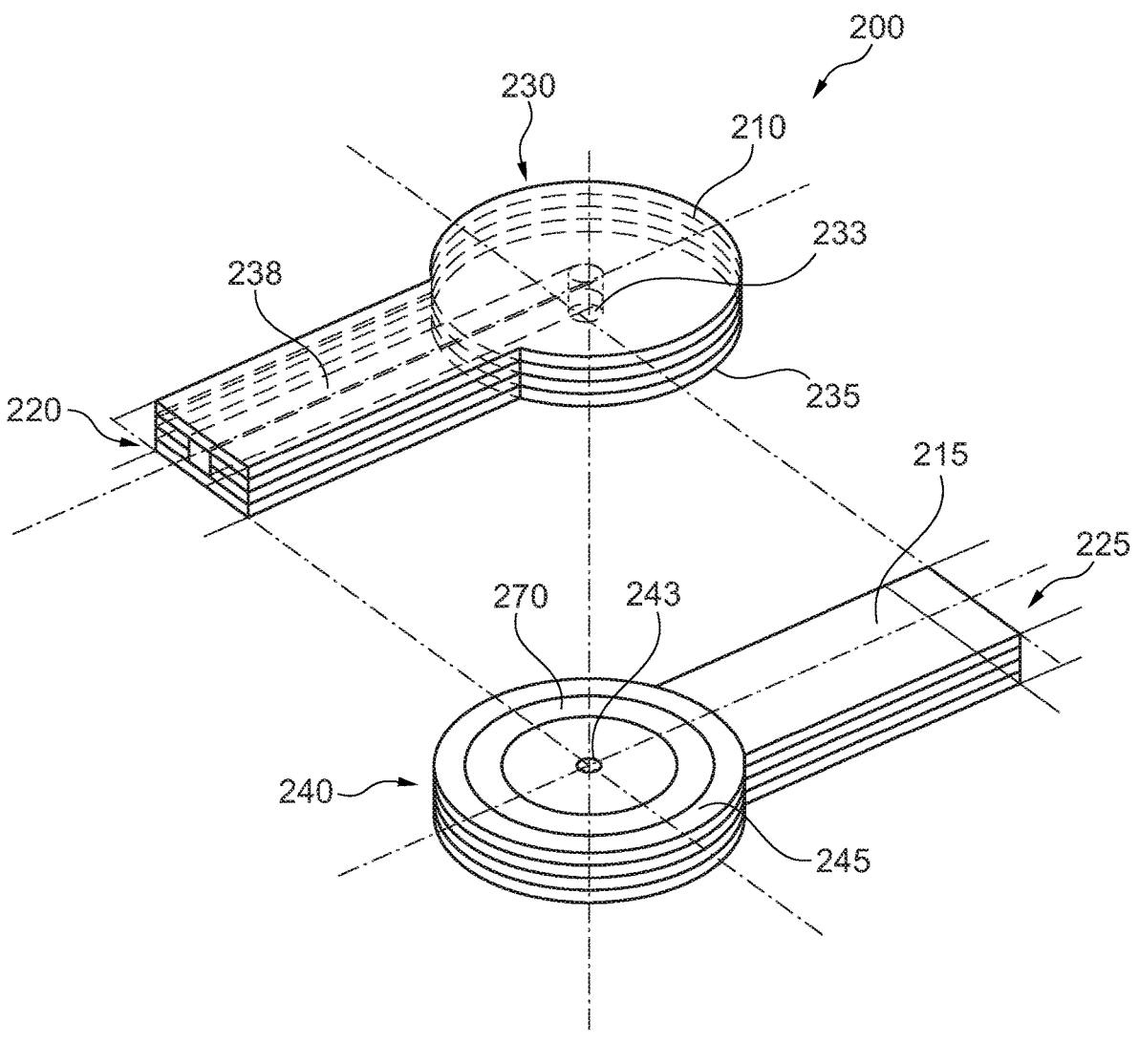
FIG. 2A is a schematic perspective view an exemplary embodiment of a fluidic coupler according to the present disclosure.
Figure 2B:
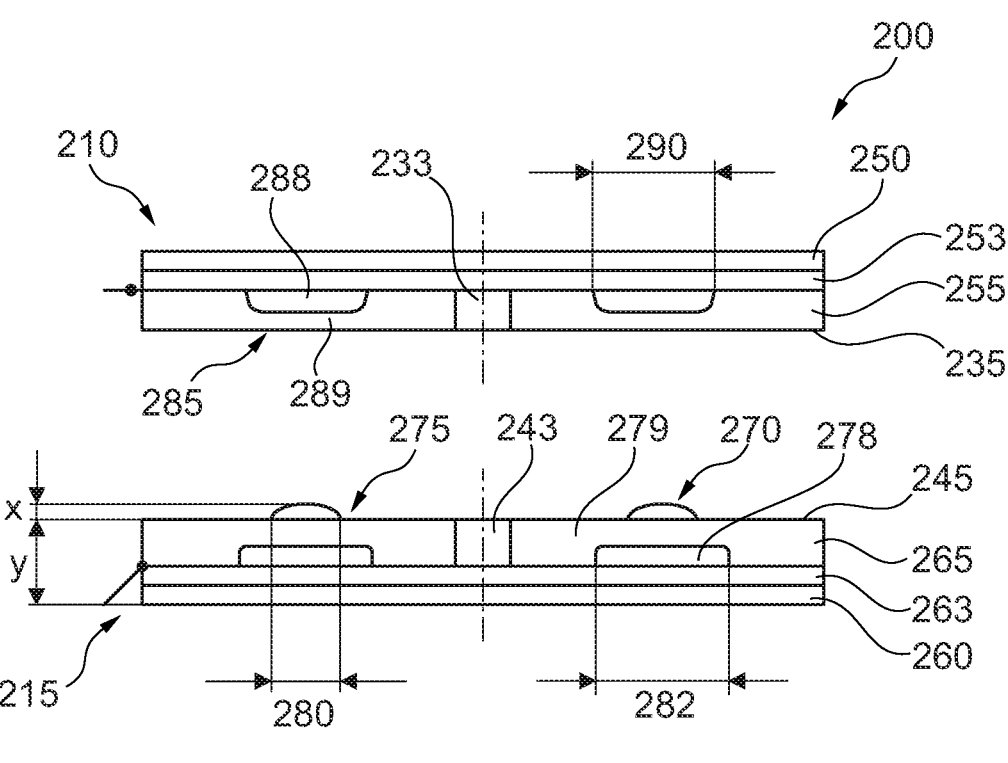
FIG. 2B is a cross-sectional view of the fluidic coupler illustrated in FIG. 2A.
Figure 2C:
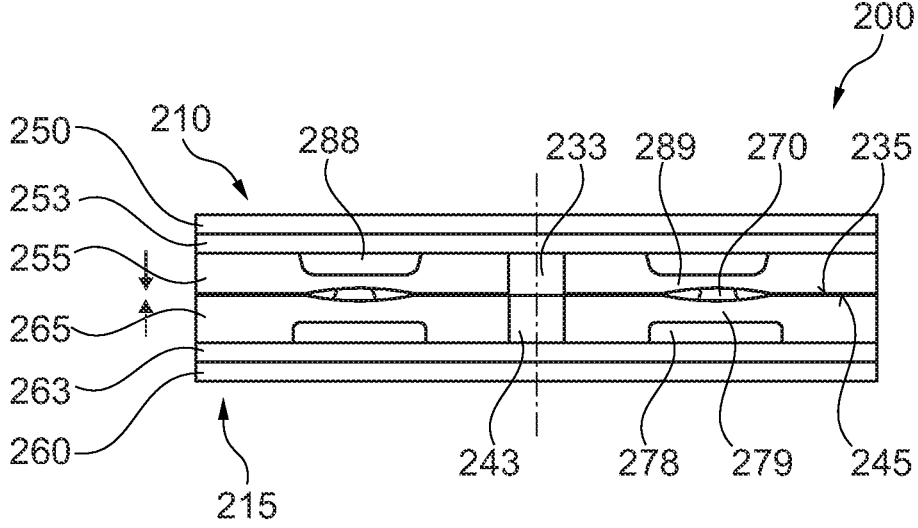
FIG. 2C is another cross-sectional view of the fluidic coupler illustrated in FIG. 2A.

FIGS. 2 show schematically an exemplary embodiment of a fluidic coupler 200 according to the present disclosure. The fluidic coupler 200 comprises a first fluidic structure 210 and a second fluidic structure 215, each being configured for conducting fluid and to be coupled with each other. FIG. 2A shows the fluidic coupler 200 in a three-dimensional representation with the first fluidic structure 210 being separated from the second fluidic structure 215, i.e. in a state of not yet being coupled together. FIG. 2B shows the fluidic coupler 200 in a two-dimensional cut-through representation corresponding to the non-coupled state of FIG. 2A. FIG. 2C shows the fluidic coupler 200 also in a two-dimensional cut-through representation (in accordance with FIG. 2B), however, in an assembled state providing a fluidic coupling between the first fluidic structure 210 and the second fluidic structure 215.

The first fluidic structure 210 and the second fluidic structure 215, as shown in FIGS. 2, may each be part of a respective fluidic device (and e.g. protruding laterally from such fluidic device) as indicated by respective break-through areas 220 and 225. Such fluidic device may be any kind of device (or a part thereof) configured for handling fluid. In the exemplary embodiment of FIGS. 2, the first fluidic structure 210 and the second fluidic structure 215 shall each be a respective fluidic conduit configured for conducting fluid. The first fluidic structure 210 and/or the second fluidic structure 215 may extend beyond the respective break-through areas 220 and 225. Alternatively, the first fluidic structure 210 and/or the second fluidic structure 215 may extend as a respective connecting piece from a respective fluidic device in order to provide a connection and/or fluidic coupling of the respective fluidic device e.g. to another fluidic device.

In the embodiment of FIGS. 2, both of the first fluidic structure 210 (best visible in FIG. 2A) and the second fluidic structure 215 are provided as planar structures. The first fluidic structure 210 has a circular contour 230 and comprises a first fluid port 233 (best visible in FIGS. 2B and 2C) located at the center of a contact surface 235. The location of the first fluid port 233 may be in a predefined relationship with the contour 230. The first fluid port 233 is fluidically connected with a fluid channel 238 (indicated by dashed lines in FIG. 2B) which may provide a fluidic connection between the fluid port 233 and the (not shown) fluidic device.

The second fluidic structure 215 (also) has a circular contour 240 (best visible in FIG. 2A) and comprises a second fluid port 243 (best visible in FIG. 2A) located at the center of a contact surface 245. The location of the second fluid port 243 (also) may be in a predefined relationship with the contour 240. The second fluid port 243 is fluidically connected with a fluid channel 248 (not visible in FIG. 2) which may provide a fluidic connection between the fluid port 243 and the (not shown) fluidic device.

The first fluidic structure 210 is adapted for being pressed against another planar coupling member of another fluidic device such as the second fluidic structure 215. Thus, a fluidic connection is established between the fluid ports 233 and 243 of the two planar coupling members of the first fluidic structure 210 and the second fluidic structure 215.

The first fluidic structure 210 and/or the second fluidic structure 215 may for example be realized as a multilayer structure comprising two or more sheets, for example composed of metal or plastic, which may be bonded together e.g. by diffusion bonding.

For example, the first fluidic structure 210 and/or the second fluidic structure 215 may be realized as a so-called metal microfluidic (MMF) structure being a multilayer structure comprising two or more metal sheets bonded together e.g. by diffusion bonding, as described e.g. in the aforementioned WO2009121410A1 or WO2017025857A1, both by the same applicant, the entire contents of which are incorporated by reference herein.

The planar first fluidic structure 210 is made of three metal sheets 250, 253, 255, as best visible in FIGS. 2B and 2C. The planar second fluidic structure 215 may also be made of three metal sheets 260, 263, 265, as best visible in FIGS. 2B and 2C. The metal sheets 250-255, 260-265 may for example be titanium sheets or stainless-steel sheets, e.g. with a thickness of about 0.05 mm up to single digit millimeter ranges. For processing the metal sheets 250-255, 260-265, techniques like e.g. electrochemical or chemical milling may be employed. Electrochemical or chemical milling may e.g. be used for forming the outer contours 230, 240 of the metal sheets, or for forming the fluid channels 238, 248, or for forming both the outer contours 230, 240 and the fluid channels 238, 248. Alternatively, the fluid channels 238, 248 may be formed by cutting a groove e.g. into the (middle) metal sheet 253, 263. Further alternatively, the fluid channels 238, 248 may be formed by using a stamping process. The fluid ports 233, 243 may be formed by cutting a via hole into the respective (outer) metal sheet 235, 245. When provided in MMF structure, the fluid ports 233, 243 may have a diameter in the range of 0.1-1 mm.

After the metal sheets 250-255, and respectively the metal sheets 260-265, have been processed, they may be bonded with each other. According to an embodiment, diffusion welding is used for bonding the metal sheets. In diffusion welding, a multilayer structure comprising two or more stacked metal sheets is put in a vacuum oven for several hours, whereby the metal sheets are pressed against one another with a contact pressing force. The stack of metal sheets may be subjected to a temperature below the melting point, and for example to a temperature between 400° C. and 1050° C. depending on the metals to be bonded. By applying heat, vacuum and a contact pressing force to the stack of metal sheets, diffusion of the metal atoms is enhanced, and strong covalent bonds are formed between adjacent metal sheets. As a result, a multilayer structure with a fluid tight fluidic channel can be obtained.

Turning back to FIGS. 2, the second fluidic structure 215 further comprises a sealing element 270, which in the shown embodiment has a ring shape and is located concentrically around the second fluid port 243. As best visible in FIG. 2B, the sealing element 270 is protruding beyond the contact surface 245 of the second fluidic structure 215, as indicated by X. The height X may be selected to be smaller than a height Y of the second fluidic structure 215, and X may be significantly smaller than Y. The sealing element 270 is arranged and configured to provide a fluidic sealing when the first fluidic structure 210 and the second fluidic structure 215 are pressed against each other (as shown in FIG. 2C), so that the fluid ports 233 and 243 are opening into each other in a fluid tight manner.

The second fluidic structure 215 further comprises an elastic structure 275 below the sealing element 270. The elastic structure 275 is provided to be elastically deformed by the sealing element 270, when the first fluidic structure 210 and the second fluidic structure 215 are pressed against each other (as shown in FIG. 2C).

In the exemplary embodiment of FIGS. 2, the elastic structure 275 is provided by a void 278, e.g. in the metal sheet 265. The void 278 may be provided below the entire area where the sealing element 270 abuts or attaches to the contact surface 245. In the shown embodiment of FIGS. 2, wherein the sealing element 270 has a ring shape and is located concentrically around the second fluid port 243, also the void 278 has a ring shape and is located concentrically around the second fluid port 243.

The part of the metal sheet 265 between the void 278 and the contact surface 245 acts as a membrane 279 which can be deformed by the sealing element 270 into the void 278, e.g. when the first fluidic structure 210 and the second fluidic structure 215 are pressed against each other (as shown in FIG. 2C).

The elastic structure 275 may be designed such that the deformation of the membrane 279 as provided by the sealing element 270 is substantially elastic, such as without or only minimal plastic deformation.

In the exemplary embodiment of FIGS. 2, the void 278 is designed to be broader than the area where the sealing element 270 abuts to the contact surface 245. In FIG. 2B, the area where the sealing element 270 abuts to the contact surface 245 is indicated by an arrow 280, while the breadth of the void 278 is indicated by an arrow 282.

As further shown in FIGS. 2, also the first fluidic structure 210 may comprise another elastic structure 285 in an area of the contact surface 235 where the sealing element 270 will abut or is abutting. The elastic structure 285 is also provided to be elastically deformed by the sealing element 270 when the first fluidic structure 210 and the second fluidic structure 215 are pressed against each other (as shown in FIG. 2C).

In the exemplary embodiment of FIGS. 2, the elastic structure 285 is provided by a void 288 in the metal sheet 255. The void 288 may be provided below the entire area where the sealing element 270 abuts or attaches to the contact surface 235. The part of the metal sheet 255 between the void 288 and the contact surface 235 acts as a membrane 289 which can be deformed by the sealing element 270 into the void 288, e.g. when the first fluidic structure 210 and the second fluidic structure 215 are pressed against each other (as shown in FIG. 2C).

The elastic structure 285 may be designed such that the deformation of the membrane 289 as provided by the sealing element 270 is substantially elastic, such as without or only minimal plastic deformation.

In the exemplary embodiment of FIGS. 2, the void 288 is designed to be broader than the area where the sealing element 270 abuts to the contact surface 235. In FIG. 2B, the breadth of the void 288 is indicated by an arrow 290.

As schematically illustrated in FIG. 2C, when the first fluidic structure 210 and the second fluidic structure 215 are pressed against each other, the sealing element 270 will deform both membranes 279 and 289. This allows that the contact surfaces 235 and 245 can at least partly abut to each other, such as at least in an area around where the first fluid port 233 opens into the second fluid port 243 in order to provide a fluid tight coupling between the first fluid port 233 and the second fluid port 243, as indicated by the arrows in FIG. 2C. This also allows to avoid or at least reduce a dead volume. Such dead volume may be generated when the first fluid port 233 and the second fluid port 243 are not fully opening into each other but also into a space between the contact surfaces 235 and 245.

While the exemplary embodiment of FIGS. 2 shows the first fluidic structure 210 having the elastic structure 275 as well as the second fluidic structure 215 having the elastic structure 285, it is clear that a fluid-tight coupling can also be provided with only one of the elastic structures 275, 285. Accordingly, plural elastic structures may be applied into a respective fluidic structure.

The elastic properties of the elastic structures 275, 285 can be designed in controlled manner, e.g. by the geometry of the respective void 278, 288 (such as the breadth 282, 290), the thickness and/or shape of the membrane 279, 289, the material(s) of the membrane 279, 289, et cetera.

Sealing properties between the first fluidic structure 210 and the second fluidic structure 215 may also be designed and/or improved by selecting the material of and/or by providing a coating on at least one of the contact surfaces 235, 245.

The elastic structures 275, 285 (or at least one of these) allow to avoid or reduce squeezing, crushing, creeping and/or flowing of the sealing element 270 when the first fluidic structure 210 and the second fluidic structure 215 are pressed against each other.

The fluidic coupler 210 allows a repeatable coupling and detaching of the first fluidic structure 210 and the second fluidic structure 215. The elastic structures 275, 285 (or at least one of these) allow that the fluid tight sealing can be maintained even after multiple couplings and detachments.

The sealing element 270 may be made of a polymer material, such as polytetrafluoroethylene (PTFE), PEEK or similar. Alternatively, noble metals, such as gold, may also be applied.

While the exemplary embodiment of FIG. 2 shows the sealing element 270 being attached to or part of the second fluidic structure 215, the sealing element 270 may also be attached to or part of the first fluidic structure 210. Alternatively, the sealing element 270 may be a loose part which may be inserted—on demand—between the first fluidic structure 210 and the second fluidic structure 215.

The voids 278, 288 may be provided e.g. by an etching process or by otherwise removing a portion of the respective sheet.

The voids 278, 288 may be provided to not be in any fluidic contact with the fluid channels 238, 248, ensuring a strict separation to the fluid flow in the fluid channels 238, 248.

In one embodiment, at least one of the voids 278, 288 is coupled to a source of pressure allowing to adjust the elastic properties of the respective elastic structures 275, 285. Such source of pressure may be a pump or a fluid supplied into the void 278, 288. In one embodiment in the liquid separation system 10 e.g. of FIG. 1, at least one of the voids 278, 288 is fluidically coupled to or supplied by the mobile phase that is driven by the pump 20. This allows increasing the elastic pressure on the sealing element 270 with an increase of pressure in the mobile phase, and the other way around.

It is clear that the concept of the fluidic coupler 200 as shown in FIG. 2 is not limited to the shown exemplary embodiment. As an example, instead of two planar structures, only one of the first fluidic structure 210 and the second fluidic structure 215 may be provided as a planar structure. Alternatively, neither of the first fluidic structure 210 and the second fluidic structure 215 may be provided as planar structure.

While the concept of the fluidic coupler 200 works exceptionally well for fluidically coupling planar structures, it is sufficient that the respective contact areas (such as the contact areas 235 and 245 in FIGS. 2) where the coupling of the first fluidic structure 210 and the second fluidic structure 215 is to be provided is sufficiently planar to allow abutting of the contact areas.

Further, the concept of the fluidic coupler 200 is not limited for only providing a single fluidic coupling between adjacent fluid ports (such as the first fluid port 233 and the second fluid port 243 in FIG. 2), but also plural fluidic couplings may be provided and accomplished.

FIG. 3 show a few exemplary embodiments according to the present disclosure.

FIG. 3A shows a fluidic structure 300 having two fluid ports 305 and 310, each being surrounded by a respective sealing element 315 and 320. The fluidic structure 300 may be used to couple with one or two individual fluidic structures, such as or similar to the first fluidic structure 210 and the second fluidic structure 215 of FIG. 2. Alternatively, the fluidic structure 300 may couple to a fluidic structure (not shown) being similarly designed as the fluidic structure 300 and also having two ports to provide a fluidic coupling with the fluid ports 305 and 310. As explained in the foregoing, at least one of the fluidic structures to be coupled to needs to provide a respective elastic structure to be elastically by the respective sealing element when pressing the two fluidic structures against each other.

FIG. 3B illustrates an embodiment of the fluidic structure 300 similar to the embodiment in FIG. 3A, however, with four fluid ports 325, 330, 333, and 335, each surrounded by a respective sealing element 336, 337, 338, and 339.

FIG. 3C illustrates an embodiment of the fluidic structure 300 similar to the embodiments in FIGS. 3A and 3B, however, with seven fluid ports 340-346, each surrounded by a respective sealing element 350-356. In contrast to the longitudinal arrangement of the fluid ports in the embodiments of FIGS. 3A and 3B, the fluid ports 340-346 are arranged in a circular manner.

FIG. 3D illustrates a different embodiment wherein the fluidic structure 300, which may be similar to the first fluidic structure 210 or the second fluidic structure 215 at least in the area of the respective contact area 233 and 245. However, a tubular conduit 360 is fluidically coupling to a fluid port 365 of the fluidic structure 300, for example by providing an adequate channel as readily known in the art. The tubular conduit 360, which may be a capillary, may be circumferentially held by a fitting 370. The mechanical and fluidic coupling and connection between the tubular conduit 260 and the fluidic structure 300 can be provided as readily known in the art. The fluid port 365 is surrounded by a sealing element 375.

The invention claimed is:

1. A fluidic coupler, comprising:
a first fluidic structure comprising a first surface, a first opening at the first surface, a first elastic structure in and/or below the first surface, and a first channel configured to conduct fluid and opening at the first opening,
wherein the first elastic structure comprises a first membrane and a first void below the first membrane, and the first membrane comprises the first surface;
a second fluidic structure comprising a second surface, a second opening at the second surface, and a second channel configured to conduct fluid and opening at the second opening; and
a sealing element positioned between the first surface and the second surface,
wherein the first fluidic structure, the second fluidic structure, and the sealing element are configured such that, when the first surface and the second surface are pressed against each other:
the first elastic structure is elastically deformed by the sealing element;
the first membrane is elastically deformed into the first void when the first elastic structure is elastically deformed by the sealing element;
the first opening and the second opening are in fluidic communication with each other, thus allowing a fluidic communication between the first channel and the second channel; and
the sealing element fluidically seals the fluidic communication between the first channel and the second channel.

2. The fluidic coupler of claim 1, comprising at least one of:

the first fluidic structure is a planar structure;

the second fluidic structure is a planar structure;

the first fluidic structure comprises a plurality of layers fixedly joined with each other, and the first channel comprises a first channel void between two of the plurality of layers;

the second fluidic structure comprises a plurality of layers fixedly joined with each other, and the second channel comprises a second channel void between two of the plurality of layers.

3. The fluidic coupler of claim 1, comprising at least one of:

the sealing element has a ring shape;

the sealing element projects beyond at least one of the first surface and the second surface, at least before pressing the first surface and the second surface against each other;

the sealing element is part of or attached to one of the first surface and the second surface.

4. The fluidic coupler of claim 1, wherein the first elastic structure is provided below an area of the first surface where the sealing element is abutting to the first surface, when the first surface and the second surface are pressed against each other.

5. The fluidic coupler of claim 1, wherein the first void and the first elastic structure are configured such that providing a pressurized fluid into the first void modifies an elastic property of the first elastic structure.

6. The fluidic coupler of claim 1, wherein the second fluidic structure comprises a second elastic structure.

7. The fluidic coupler of claim 6, wherein the second elastic structure comprises a second membrane and a second void below the second membrane, the second membrane comprises the second surface, and the second membrane is elastically deformed into the second void when the second elastic structure is elastically deformed by the sealing element.

8. The fluidic coupler of claim 6, wherein the second void and the second elastic structure are configured such that providing a pressurized fluid into the second void modifies an elastic property of the second elastic structure.

9. The fluidic coupler of claim 1, comprising a force applicator configured to press the first surface and the second surface against each other.

10. The fluidic coupler of claim 1, wherein the first opening and the second opening are adjacent to and substantially aligned with each other, when the first surface and the second surface are pressed against each other.

11. The fluidic coupler of claim 1, wherein:

at least one of the first fluidic structure and the second fluidic structure is a planar structure;

the first fluidic structure comprises a plurality of layers fixedly joined with each other, and the first channel is disposed between two of the plurality of layers;

the first surface is provided by an outer layer of the plurality of layers; and the first elastic structure comprises a portion of the outer layer and the first void is below the portion of the outer layer, wherein the portion of the outer layer above the first void is configured to act as the first membrane elastically deformable into the first void when the first elastic structure is elastically deformed by the sealing element.

12. The fluidic coupler of claim 11, wherein the layers are composed of a metal material.

13. The fluidic coupler of claim 1, wherein at least one of the first fluidic structure and the second fluidic structure comprises a material selected from the group consisting of: metal; steel; ceramics; aluminum oxide; manganese oxide; zirconium oxide; aluminum nitrate;

polymer; PEAK; PEEK; PEKK; and PEI.

14. The fluidic coupler of claim 1, wherein the sealing element comprises a material selected from the group consisting of: ductile and printable polymer compounds; PEAK; PEEK; PEKK; and PEI.

15. The fluidic coupler of claim 1, wherein:

at least one of the first fluidic structure and the second fluidic structure is a planar structure;

the second elastic structure comprises a second membrane and a second void below the second membrane, the second membrane comprises the second surface, and the second membrane is elastically deformed into the second void when the second elastic structure is elastically deformed by the sealing element;

the second fluidic structure comprises a plurality of layers fixedly joined with each other, and the second channel is disposed between two of the plurality of layers;

the second surface is provided by an outer layer of the plurality of layers; and the second elastic structure comprises a portion of the outer layer and the second void is below the portion of the outer layer, wherein the portion of the outer layer above the second void is configured to act as the second membrane elastically deformable into the second void when the second elastic structure is elastically deformed by the sealing element.

16. The fluidic coupler of claim 1, wherein the sealing element is configured to fluidically seal the fluidic communication between the first channel and the second channel in a pressure range of up to 2000 bar.

17. A fluid separation system for separating compounds of a sample fluid in a mobile phase, the fluid separation system comprising:

a mobile phase drive configured to drive the mobile phase through the fluid separation system;

a separation unit configured to separate compounds of the sample fluid in the mobile phase;

and the fluidic coupler of claim 1.

18. The separation system of claim 17, further comprising at least one of:

a sample dispatcher configured to introduce the sample fluid into the mobile phase;

a detector configured to detect separated compounds of the sample fluid;

a collection unit configured to collect separated compounds of the sample fluid;

a data processing unit configured to process data received from the fluid separation system;

a degassing apparatus configured to degas the mobile phase.

19. A method for forming a fluidic coupler, the method comprising:

providing a first fluidic structure comprising a first surface, a first opening at the first surface, a first elastic structure in and/or below the first surface, and a first channel configured to conduct fluid and opening at the first opening, wherein the first elastic structure comprises a first membrane and a first void below the first membrane, and the first membrane comprises the first surface;

providing a second fluidic structure comprising a second
surface, a second opening at the second surface, and a
second channel configured to conduct fluid and open-
ing at the second opening;

positioning a sealing element between the first surface and
the second surface; and pressing the first surface and the second surface against
each other, such that:

the sealing element elastically deforms the first elastic
structure; the first membrane is elastically deformed
into the first void when the first elastic structure is
elastically deformed by the sealing element;

the first opening and the second opening are in fluidic
communication with each other, thus allowing a fluidic
communication between the first channel and the sec-
ond channel; and the sealing element fluidically seals the fluidic commu-
nication between the first channel and the second
channel.

* * * * *